Patented Sept. 11, 1928.

1,684,094

UNITED STATES PATENT OFFICE.

JAMES ROBINSON HATMAKER, OF PARIS, FRANCE.

ICE CREAM AND METHOD OF MAKING SAME.

No Drawing.   Application filed September 20, 1927. Serial No. 220,850.

My invention is an improvement in commercially-made ice-cream, i. e. ice-cream made in quantity and having storage or keeping qualities as distinguished from ice-cream made domestically for immediate use.

Commercial ice-cream containing, for example, 12 per cent of butter-fat, 10 per cent of milk solids other than butter-fat, 16 per cent of sugar and 62 per cent of water (with flavoring and a small percentage of gelatine) is now made up largely of condensed skim or separated milk, the practice being—in order to get the necessary concentration for making ice-cream—to separate the cream from a relatively large quantity of milk to get thick cream and then to condense a portion of the separated milk resulting by boiling it in vacuo for a considerable time; and to add that condensed separated milk to the cream, with some fresh milk (to give the final product a more natural texture and flavor), and then to add the necessary flavoring and sugar and stabilizing and neutralizing agents.

I have discovered a new way of making ice-cream mixtures which avoids completely the use in them of condensed skim or separated milk and which produces ice-cream of improved quality.

In the making of ice-cream, I go upon the principle of keeping the solids of natural whole milk integrally together to the maximum extent possible—adding to such solids only additional butter-fat in the form of fresh cream; and my process is as follows:

To make, for example, ice-cream containing approximately 12 per cent of butter-fat, 10 per cent of milk solids other than butter-fat, 16 per cent of sugar and about 62 per cent of water, without using any skim or separated milk. I dry, by any good drying process—but preferably by the rapid, high-temperature process described and claimed in the United States Patent Re-issue No. 13,232, dated May 2, 1911—425 pounds of natural whole milk and I incorporate the dry milk solids thus obtained integrally therefrom as a result of such drying, with 575 pounds of natural whole liquid milk—preferably when such milk is warm—as described and claimed in my United States Patent No. 1,626,818, of May 3, 1927. To that mixture I add 210 pounds of thick fresh cream containing 40 per cent of butter-fat (i. e. the butter-fat of about 2280 pounds of average natural whole milk) and 160 pounds of sugar and any desired flavoring and about ½ per cent of gelatine or equivalent stabilizer. The mixture is then, preferably, emulsified or homogenized in any suitable way and then frozen.

Separated milk is always more acid than fresh natural whole milk and boiling it for a considerable time in vacuo to condense it, does not improve it and my ice-cream is superior in quality to ice-cream containing separated milk condensed in vacuo. Furthermore my new process is quicker to execute and requires a much less expensive plant and my product does not require the addition of any bicarbonate of soda or other neutralizing agent.

It is necessary only to know the composition of the particular natural milk and of the fresh cream used in order to calculate the quantities to be used to obtain ice-cream of any particular composition and I do not limit my invention to the composition herein given by way of example.

Fresh butter may be used as a source of butter-fat instead of cream, in the execution of my process, but, for the reasons stated above, I prefer the use of fresh cream.

I claim:

1. The process of making ice-cream mixtures which consists in drying a suitable portion of a given quantity of natural whole milk and in incorporating the dry solids obtained integrally therefrom with the remaining portion of such milk and in adding thereto suitable quantities of cream, sugar and stabilizing and flavoring materials, substantially as described.

2. The process of making ice-cream mixtures which consists in incorporating the dry solids of approximately 42½ parts of natural whole milk with approximately 57½ parts of natural whole milk and in adding thereto suitable quantities of cream, sugar and stabilizing and flavoring materials, substantially as described.

3. The process of making ice-cream which consists in drying approximately 13 per cent of a given quantity of natural whole milk and in incorporating the dry solids obtained integrally by such drying with approximately 17½ per cent of such milk in its natural state and in adding thereto the cream of the remaining 69½ per cent of the said milk and a suitable quantity of sweetening and of other flavoring and of a suitable stabilizer and in then freezing the mixture.

4. Ice-cream mixtures composed entirely of natural whole milk and of milk solids obtained integrally from natural whole milk and from cream (with added sugar and stabilizing and flavoring materials), the said mixtures when complete and ready for freezing containing approximately 57½ per cent by weight of whole milk in its natural state.

5. Ice-cream mixtures containing approximately 62 per cent of water and being composed to the extent of approximately 57½ per cent by weight of natural whole milk, the remainder of the milk solids and of the water of the mixtures (amounting approximately to a total of 26½ per cent) being obtained integrally from natural whole milk and from cream, the remaining 16 per cent of the mixtures being made up principally of sugar.

JAMES R. HATMAKER.